United States Patent
Maxwell et al.

(10) Patent No.: US 11,891,213 B2
(45) Date of Patent: Feb. 6, 2024

(54) THERMOPLASTIC BAGS WITH DUPLICATIVE SEALS

(71) Applicant: THE GLAD PRODUCTS COMPANY, Oakland, CA (US)

(72) Inventors: Jason R. Maxwell, Elgin, IL (US); Robert T. Dorsey, Western Spring, IL (US); Michael G. Borchardt, Naperville, IL (US); Edward B. Tucker, Yorkville, IL (US); Jack F. Melvan, Oak Forest, IL (US); Shaun T. Broering, Fort Thomas, KY (US); Matthew W. Waldron, West Chester, OH (US); Richard D. Palmer, Sycamore, IL (US); Deborah K. Fix, Maineville, OH (US); Zeljko Vidovic, Mount Prospect, IL (US)

(73) Assignee: The Glad Products Company, Oakland, CA (US)

( * ) Notice: Subject to any disclaimer, the term of this patent is extended or adjusted under 35 U.S.C. 154(b) by 164 days.

(21) Appl. No.: 17/424,452

(22) PCT Filed: Feb. 11, 2020

(86) PCT No.: PCT/US2020/017592
§ 371 (c)(1),
(2) Date: Jul. 20, 2021

(87) PCT Pub. No.: WO2020/167710
PCT Pub. Date: Aug. 20, 2020

(65) Prior Publication Data
US 2022/0081168 A1 Mar. 17, 2022

Related U.S. Application Data

(60) Provisional application No. 62/803,967, filed on Feb. 11, 2019.

(51) Int. Cl.
*B65D 33/02* (2006.01)
*B29C 65/20* (2006.01)
(Continued)

(52) U.S. Cl.
CPC .............. *B65D 33/02* (2013.01); *B29C 65/20* (2013.01); *B65D 33/28* (2013.01); *B29L 2031/7129* (2013.01)

(58) Field of Classification Search
CPC .......... B65D 33/02; B65D 33/28; B65D 1/00; B65D 1/28; B65D 3/22; B65D 75/00; B29C 65/20
See application file for complete search history.

(56) References Cited

U.S. PATENT DOCUMENTS 4,016,806 A * 4/1977 Schuster ................. B31B 70/00
493/212
9,586,726 B1 * 3/2017 Moody ................... B65F 1/002
(Continued)

FOREIGN PATENT DOCUMENTS

CN      1646389 A    7/2005
CN    104736446 A    6/2015
(Continued)

OTHER PUBLICATIONS

Application No. PCT/US2020/017592 International Search Report dated Jun. 12, 2020.
(Continued)

*Primary Examiner* — Derek J Battisti
(74) *Attorney, Agent, or Firm* — Keller Preece PLLC

(57) ABSTRACT

A thermoplastic bag includes duplicative seals. In particular, in one or more implementations, a thermoplastic bag includes a first seal and at least a second seal reinforcing the same area of the thermoplastic bag. For instance, in one or more implementations, the thermoplastic bag includes mul-
(Continued)

tiple seals along each side edge or along the hem. If one seal fails, the other seal(s) can remain in place to prevent leaks. Thus, the duplicative seals of the thermoplastic bag can provide reinforced strength and desired aesthetics.

15 Claims, 12 Drawing Sheets

(51) Int. Cl.
    *B65D 33/28*     (2006.01)
    *B29L 31/00*     (2006.01)

(56) References Cited

U.S. PATENT DOCUMENTS

| | | | | |
|---|---|---|---|---|
| 11,161,652 | B1* | 11/2021 | Engelking | B65D 33/28 |
| 2003/0072505 | A1* | 4/2003 | Pihl | B29C 55/06 |
| | | | | 383/75 |
| 2010/0046860 | A1* | 2/2010 | Kent | B65F 1/0006 |
| | | | | 383/75 |
| 2010/0195937 | A1 | 8/2010 | Fraser et al. | |
| 2010/0303388 | A1 | 12/2010 | Kent et al. | |
| 2011/0299797 | A1* | 12/2011 | Petkovsek | B65D 33/2566 |
| | | | | 493/214 |
| 2013/0330025 | A1* | 12/2013 | Broering | B65D 33/28 |
| | | | | 383/75 |
| 2017/0008261 | A1* | 1/2017 | Jean-Mary | B32B 27/08 |
| 2021/0387758 | A1* | 12/2021 | Brosch | B65B 5/04 |

FOREIGN PATENT DOCUMENTS

| | | | | |
|---|---|---|---|---|
| CN | 106934391 A | | 9/2016 | |
| CN | 106132838 A | | 11/2016 | |
| DE | 102010047887 | * | 2/2012 | ............ B65D 30/04 |
| JP | H0920348 A | | 1/1997 | |
| JP | 2000211656 A | | 8/2000 | |
| WO | 2001/094224 | | 12/2001 | |

OTHER PUBLICATIONS

Application No. PCT/US2020/017592 Written Opinion of the International Searching Authority dated Jun. 12, 2020.
Office Action as received in CN Application 202080013668.3 dated Sep. 7, 2022.

\* cited by examiner

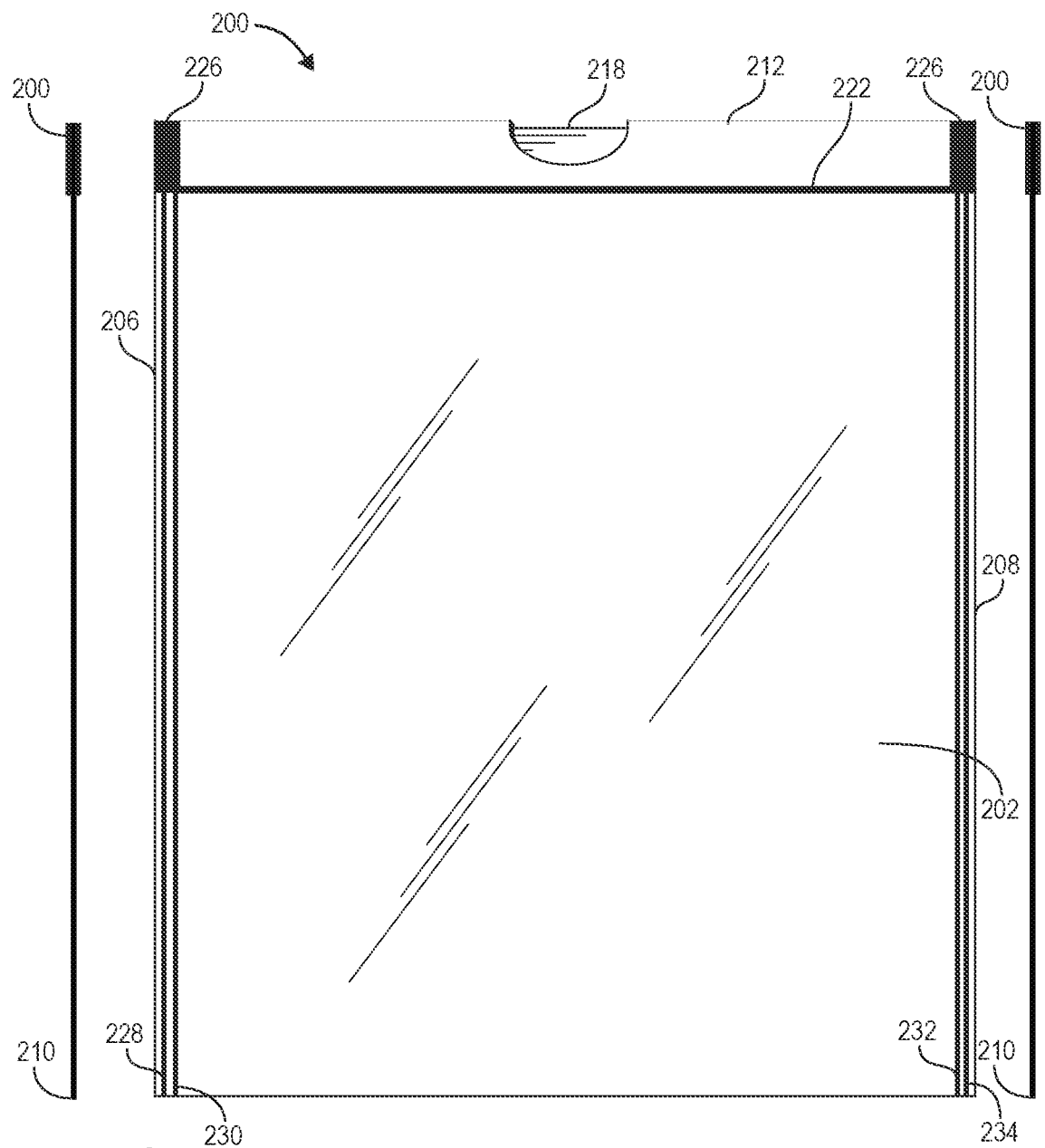
*Fig. 2C*        *Fig. 2B*        *Fig. 2D*

THERMOPLASTIC BAGS WITH DUPLICATIVE SEALS

CROSS-REFERENCE

This application claims the benefit of and priority to U.S. Provisional Application No. 62/803,967, filed on Feb. 11, 2019. The disclosure is herein incorporated by reference in its entirety.

BACKGROUND

1. Technical Field

The present application relates generally to thermoplastic bags and methods of making thermoplastic bags. More particularly, the present application relates to thermoplastic bags including side seals.

2. Background and Relevant Art

Thermoplastic films are a common component in various commercial and consumer products. For example, grocery bags, trash bags, sacks, and packaging materials are products that are commonly made from thermoplastic films. The cost to produce products including thermoplastic films is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films or stretch the thermoplastic films, thereby increasing surface area and reducing the amount of thermoplastic film needed to produce a product of a given size. Unfortunately, stretched or otherwise thinner thermoplastic films can have undesirable properties. For example, thinner thermoplastic films are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films.

As such, manufacturers may be dissuaded to stretch a film or use thinner films despite the potential material savings. This is particularly the case when strength is an important feature in the thermoplastic product. For example, thermoplastic trash bags need to be puncture and tear resistant to avoid inadvertently spilling any contents during disposal. The liquid impervious nature of the thermoplastic materials is desirable for retaining liquids that are often the by-products of discarded garbage. Leaks may develop even in the sturdiest of bags due to failure at the seams. Bags with thinner films can be more susceptible to failure at the seams and leakage. Such leakage, as will be appreciated, allows liquids to drain to the bottom of the garbage can or directly onto the floor or ground when the bag is being removed.

Accordingly, continued improvement is needed to address the unique problems associated with bags while conserving the use of thermoplastic materials.

BRIEF SUMMARY

One or more implementations of the present invention provide benefits and/or solve one or more of the foregoing or other problems in the art with thermoplastic bags with duplicative seals. In particular, in one or more implementations, a thermoplastic bag includes a first seal and at least a second seal reinforcing the same area of the thermoplastic bag. For instance, in one or more implementations, the thermoplastic bag includes multiple seals along each side edge. If one seal fails, the other seal(s) can remain in place to prevent leaks. Thus, the duplicative seals of the thermoplastic bag can provide reinforced strength. Optionally, the duplicative seals can while allowing bags with thinner thermoplastic films without compromising the strength and resistance of the bag to leakage.

For example, an implementation of a thermoplastic bag with duplicative seals comprises first and second sidewalls comprising thermoplastic films. The first and second sidewalls comprise a first side edge, an opposite second side edge, a bottom edge, and an opening along respective top edges. The thermoplastic bag includes a first seal securing at least two plies of thermoplastic film together along a first portion of the thermoplastic bag. The thermoplastic bag also includes a second seal securing the at least plies of thermoplastic film together along the first portion of the thermoplastic bag.

Additionally, in another implementation, a thermoplastic bag with duplicative seals comprises first and second opposing sidewalls joined together along a first side edge, an opposite second side edge, and a bottom edge. The first and second sidewalls are un-joined along at least a portion of their respective top edges to define an opening for the thermoplastic bag. The thermoplastic bag further includes a first pair of side seals securing the first and second sidewalls together along the first side edge. The thermoplastic bag also includes a second pair of side seals securing the first and second sidewalls together along the second side edge.

In addition to the foregoing, a method of forming thermoplastic bags with duplicative seals involves providing a first thermoplastic film with a top edge and a bottom edge. The method then involves folding the first thermoplastic film along its width to bring the bottom edge proximate the top edge and to form a first film half and a second film half joined at a bottom fold. The method further involves applying a first heat seal bar to the folded first film half and the second film half to form: a first pair of side seals extending perpendicular to the bottom fold and a second pair of side seals extending perpendicular to the bottom fold. The method also involves applying a second heat seal bar to the folded first film half and the second film half to form: a third pair of side seals extending perpendicular to the bottom fold and a fourth pair of side seals extending perpendicular to the bottom fold.

Additional feature and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific implementations thereof that are illustrated in the appended drawings. It should be noted that the figures are not drawn to scale, and that elements of similar structure or function are generally represented by like reference numerals for illustrative purposes throughout the figures. Understanding that these drawings depict only typical implementations of the invention and are not therefore to be considered to be limiting of its scope, the invention will be described and explained with additional specificity and detail through the use of the accompanying drawings in which:

FIG. 2B illustrates a front view of the thermoplastic bag with duplicative seals of FIG. 2A;

FIG. 2C illustrates a left side view of the thermoplastic bag with duplicative seals of FIG. 2A;

FIG. 2D illustrates a right side view of the thermoplastic bag with duplicative seals of FIG. 2A;

DETAILED DESCRIPTION

Figure 1A:
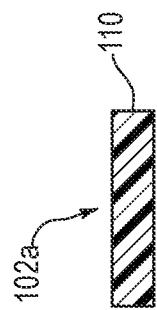
FIGS. 1A-1C illustrate views of various films structures in accordance with one or more implementations of the present invention.

One or more implementations of the present invention include thermoplastic bags with duplicative seals. In other words, the thermoplastic bags a first seal and at least a second seal reinforcing the same area of the thermoplastic bag. For instance, in one or more implementations, the thermoplastic bag includes multiple seals along each side edge or multiple side seals. If one seal fails, the other seal(s) can remain in place to prevent leaks. Thus, the duplicative seals of the thermoplastic bag can provide additional strength and leak prevention.

In one or more implementations, the duplicative seals can be repetitive. In other words, the seals can have the same size, shape, and bond strength. In such implementations, the secondary seals can act as backup seals to prevent leaks in event that the primary seal fails. Implementations can include a primary seal and one or more secondary seals. For example, one or more implementations include two, three, four seals along each side edge and/or hem.

In additional or alterative implementations the primary and second seals can vary. For example, in one or more implementations the primary seal is configured to have a first bond strength and the secondary seal(s) is configured to have a second bond strength that differs from the first bond strength. For example, the secondary seal(s) can form a relatively weak bond between the layers that is configured to fail or separate before the layers/films secured together by the secondary seals. In other words, the bond strength of the secondary seal(s) is less than a weakest tear resistance of each of the individual films being bonded together so as to cause the secondary seal(s) to fail prior to failing of the film layers. On the other hand, the primary seal can be a permanent seal. In particular, the primary seal(s) can form a relatively strong between the layers. In other words, the bond strength of the primary seal(s) is greater than a strongest tear resistance of each of the individual films being bonded together so film layers will tear or fail before the primary seal fails. In such implementations, the secondary seals can absorb initial forces applied to the duplicative seals by breaking the bonds between the layers rather than allowing that same force to act on the primary seals.

In further implementations the primary and secondary seals can vary in size (e.g., length, width) or shape. For example, the primary seals can have a traditional linear shape while the secondary seal(s) have a decorative shape. Specifically, the secondary seals can have a curvilinear, serpentine, or other visually distinctive shape. In such implementations, the primary seals can have a functional purpose (to secure layers together) while the secondary seals have an aesthetic and functional purpose. Additionally, the primary seals can be wider or longer than the secondary seals. For example, the primary seals can extend from the top of the bag to the bottom of the bag, while the second seals extend from a point between the top of the bag and the middle of the bag and extend to the bottom of the bag.

More particularly, in one or more implementations of the present disclosure comprise thermoplastic bags with liquid directing seals. In particular, in one or more implementations, a thermoplastic bag includes seals that direct liquid away from areas of the bag more susceptible to failure and leaking. More specifically, one or more implementations include liquid directing seals that extend away from a side of the bag (e.g., proximate a side edge) to a bottom of the thermoplastic bag. As such, the liquid directing seals can direct liquid away from the corners of the thermoplastic bag. For example, the liquid directing seals can prevent liquid from reaching the corners of the thermoplastic bag by sealing the corners of the thermoplastic bag off from the rest of the thermoplastic bag. Thus, the thermoplastic bag with liquid directing seals can help reduce or eliminate leaks by preventing liquid from reaching the corners of the thermoplastic bag where, due to stress concentrations, leaks are prone to occur.

In one or more implementations, the duplicative seals have a gap between them. The gap can ensure that each seal is distinctly visible to a user. The visibility of multiple seals reinforcing the same edge or hem can provide a visual cue to a user of the enhanced strength and leak protection provided by the thermoplastic bag. In alternative embodiments, the duplicative seals directly abut against one another so as to appear as one wide seal. In such implementations, the duplicative seals can still vary in bond strength or other properties despite visually appearing as a single film.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable. In addition to a thermoplastic material, films of one or more implementations of the present invention can also include one or more additives. Additional additives that may be included in one or more implementations include pigments, slip agents, anti-block agents, voiding agents, or tackifiers.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic material. As used herein, the term "elastic-like" describes the behavior of web materials which when subjected to an applied strain, the web materials extend in the direction of applied strain, and when the applied strain is released the web materials return, to a degree, to their pre-strained condition.

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, co-extruded bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two-conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of the foregoing patent are incorporated herein by reference in their entirety. Examples of various extruders, which can be used in producing the films to be used with the present invention, can be a single screw type modified with a blown film die, an air ring, and continuous take off equipment.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.35 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

Figure 1B:
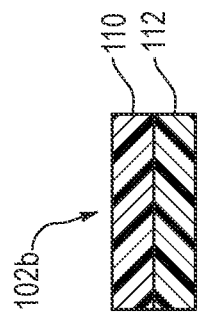
Figure 1C:
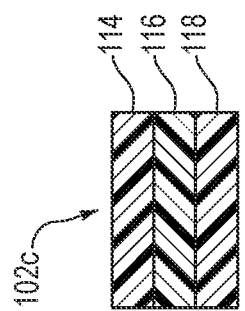

FIGS. 1A-1C illustrate individual films for use in one or more implementations. FIG. 1A illustrates a film 102a of a single layer 1110. In another implementation, as illustrated by FIG. 1B, a film 102b can have two layers (i.e., a bi-layered film). In particular, the film 102b can include a first layer 110 and a second layer 112. The first and second layers 110, 112 can optionally include different grades of thermoplastic material or include different additives, including polymer additives. In still another implementation, shown in FIG. 1C, a film 102c can include three layers (i.e., a tri-layered film). For example, FIG. 1C illustrates that the film 102c can include a first layer 114, a second layer 116, and a third layer 118. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the films can comprise layer ratios of 20:20:60, 40:40:20, 15:70:15, 33:34:33, 20:60:20, 40:20:40, or other ratios.

Example films include a three-layer B:A:B structure, where the ratio of layers can be 20:60:20. The exterior B layers (i.e., 114, 118) can comprise a mixture of hexene LLDPE of density 0.918, and metallocene LLDPE of density 0.920. The interior A core layer (116) can comprise a mixture of hexene LLDPE of density 0.918, butene LLDPE of density 0.918, reclaimed resin from trash bags.

In another example, the film 102c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 102c.

FIGS. 2A-2E illustrate various view of a thermoplastic bag with duplicative seals 200. While the bags of one or more implementations are generally capable of holding a vast variety of different contents, the thermoplastic bag with duplicative seals 200 illustrated in the figures may be sized and configured to be used as a liner for a garbage can or similar refuse container. In other implementations, thermoplastic bags with duplicative seals can be sized and configured for other uses, such as food containers, etc.

The thermoplastic bag with duplicative seals 200 includes a first sidewall 202 and a second sidewall 204. The first and second side walls 202, 204 can each comprise one or more of the films 102a, 102b, 102c described above in relation to FIGS. 1A-1C. The first and second sidewalls 202, 204 can have a first side edge 206, an opposing second side edge 208, and along a bottom edge 210. The bottom edge 210 can extend between the first and second side edges 206, 208. The first and second sidewalls 202, 204 may be joined along the first and second side edges 206, 208 and bottom edge 210 by any suitable process such as, for example, a heat seal. In one or more implementations, the bottom edge 210 of one or more of the side edges 206, 208 can comprise a fold. For example, the side edges 206, 208 can be joined by heat seals and the bottom edge 210 can comprise a fold.

To allow access to the interior volume of the thermoplastic bag 200, at least a portion of top edges 212 of the first and second sidewalls 202, 204 may be un-joined to define an opening 213. The opening 213 can be opposite the bottom edge 210. When placed in a trash receptacle, the top edges 212 of the first and second sidewalls 202, 204 may be folded over a rim of the receptacle.

Figure 2A:
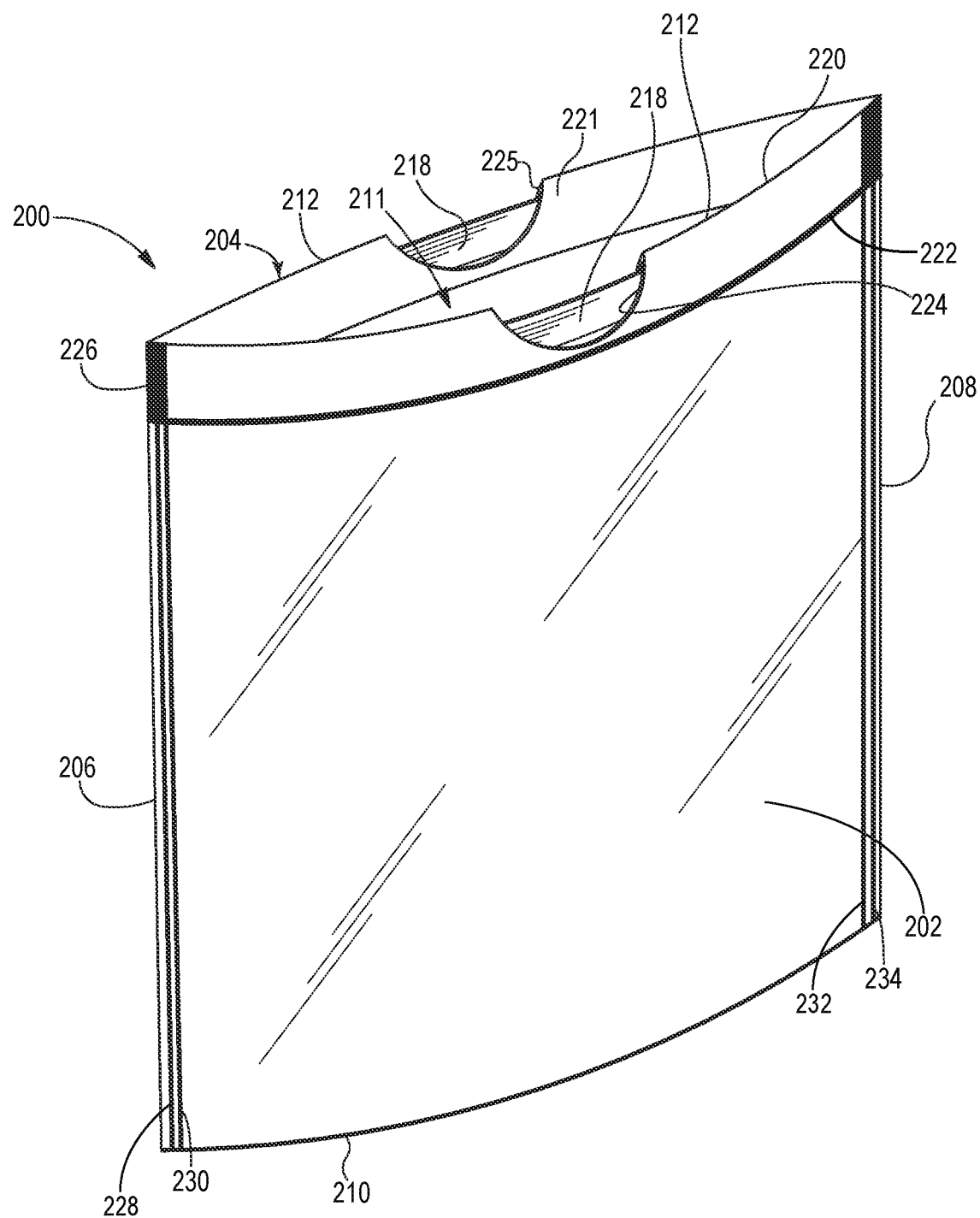
FIG. 2A illustrates a perspective view of a thermoplastic bag with duplicative seals in accordance with one or more implementations of the present invention.
Figure 2E:
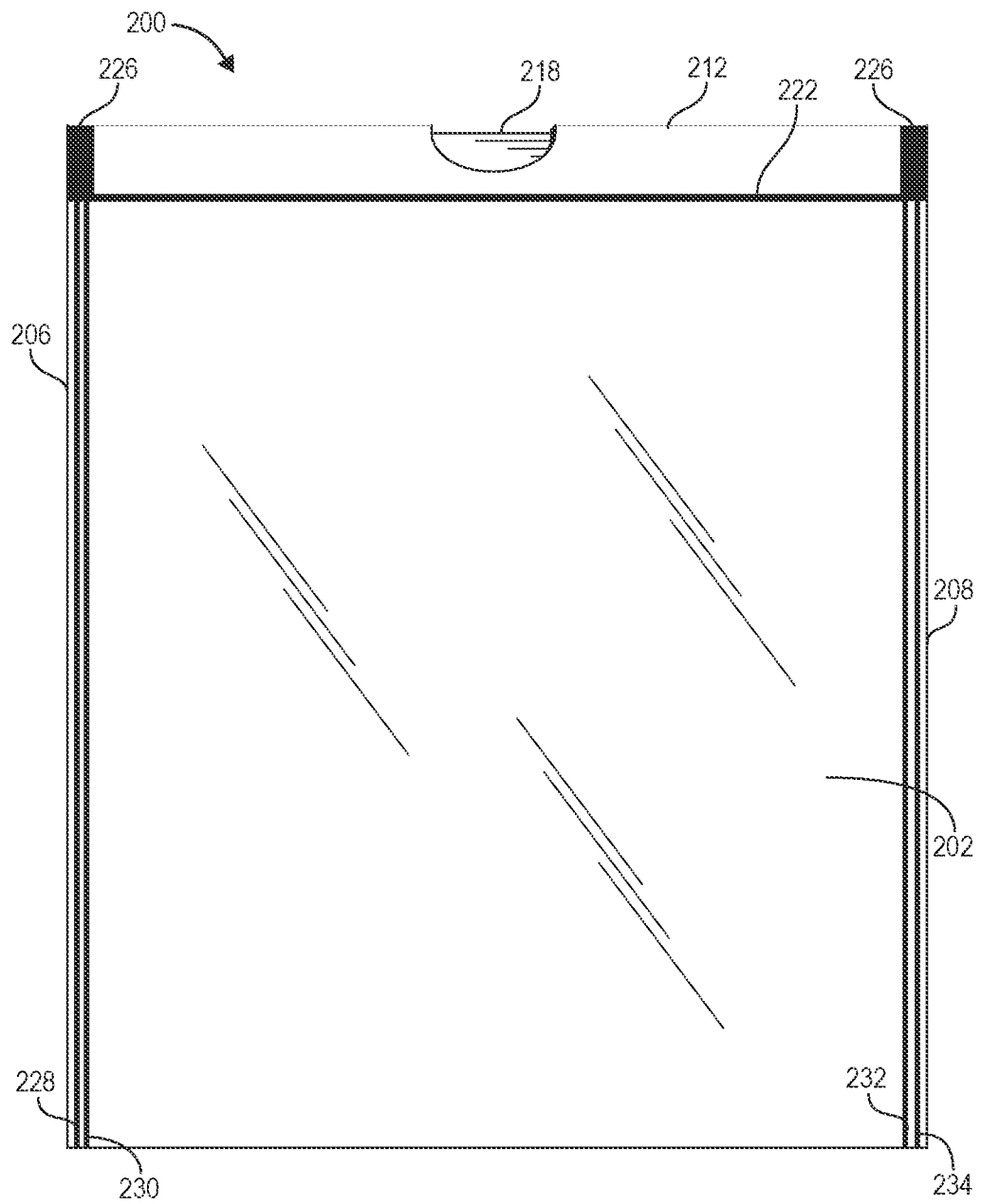
FIG. 2E illustrates a back view of the thermoplastic bag with duplicative seals of FIG. 2A.

The thermoplastic bag with duplicative seals 200 also optionally includes a closure mechanism located adjacent to the upper edges 212 for sealing the top of the thermoplastic bag 200 to form a fully-enclosed container or vessel. As shown by FIGS. 2A, 2B, & 2E, the closure mechanism can comprise a draw tape 218. To accommodate the draw tape 218 the first top edge 212 of the first sidewall 202 may be folded back into the interior volume and may be attached to the interior surface of the sidewall by a hem seal 222 to form a first hem 220. Similarly, the second top edge 212 of the second sidewall 204 may be folded back into the interior volume and may be attached to the second sidewall 204 by a hem seal to form a second hem 221. Alternatively, the top edge may be folded outwardly about the sidewalls 202, 204 to form the hem.

As shown by FIGS. 2A, 2B, & 2E, in one or more implementations, the draw tape 218 extends through the first and second hems 220, 221 and along the first and second top edge 212. To access the draw tape 218, first and second notches 224, 225 may be disposed through the respective first and second top edges 212. Pulling the draw tape 218 through the notches 224, 225 will constrict the first and second top edge 212 thereby closing or reducing the opening 211. The draw tape 218 can be secured to the side edges 206, 208 by a heat seals (e.g., a tape seals) 226. The draw tape closure may be used with any of the implementations of a thermoplastic bag with duplicative seals described herein. One will appreciate in light of the disclosure herein that the present invention is not limited to draw tape closure mechanisms. In alternative implementations, the closure mechanism can comprise flaps, adhesive tapes, a tuck and fold closure, an interlocking closure (e.g., a zipper), a slider closure, or other closure structures.

As shown by FIGS. 2A, 2B, & 2E, the thermoplastic bag with duplicative seals 200 can include duplicative seals. In particular, the thermoplastic bag with duplicative seals 200 comprises a first pair of duplicative side seals (e.g., a first seal 228 and a second seal 230) and a second pair of duplicative side seals (e.g., a third seal 232 and a fourth seal 234). The duplicative seals 228-234 can extend from the hem seals 222 to the bottom edge 210.

As shown the first and second seals 228, 230 each secure the first and second side walls 204, 206 together along the first side edge 206. Similarly, the third and fourth seals 232, 234 each secure the first and second side walls 204, 206 together along the second side edge 208. By including multiple seals, the thermoplastic bag 200 can be less susceptible to failure and leaks along the portions reinforced by the duplicative seals (e.g., the side edges 206, 208).

As shown by FIGS. 2A, 2B, & 2E, the first and second seals 228, 230 are linear and are separated by a gap (e.g., an area between the seals in which the first and second side walls 204, 206 are not sealed together). Similarly, the third and fourth seals 232, 234 are linear and are separated by a gap (e.g., an area between the seals in which the first and second side walls 204, 206 are not sealed together). The gap between the duplicative seals can ensure that the duplicative seals are visually distinct. The separated seals can connote strength to a user/consumer of the thermoplastic bag 200. Furthermore, the duplicative seals can provide additional strength. In particular, two or more seals securing multiple plies of film together (e.g., the first and second sidewalls) helps ensure that the side edges are fully bonded and will not leak.

In addition to the foregoing, one of the duplicative seals can comprise a peel-able seal. For example, in one or more implementations the second and third seals 230, 232 are peel-able seals. In other words, a bond strength of the second and third seals 230, 232 can cause the second and third seals 230, 232 to fail prior to failure of the first or second sidewalls 202, 204. More particularly, the bond strength of the second and third seals 230, 232 can be less than a weakest tear strength of the film layer(s) of the first and second side walls 202, 204.

The weak nature of the second and third seals 230, 232 can cause them to fail when subjected to forces consistent with typical use of a trash bag. In this manner, the second and third seals 230, 232 can absorb forces and prevent at least some of the forces from acting on the first and fourth seals 228, 234. As such, the inner seals 230, 232 can act as shock absorbers to help protect the outer seals 228, 234.

In one or more implementations, the first and fourth seals 228, 234 can comprise non-peel-able seals. In other words, a bond strength of the first and fourth seals 228, 234 can prevent the first and fourth seals 228, 234 from failing prior to failure of the first or second sidewalls 202, 204. In other words, the first and second sidewalls 202, 204 will tear prior to the first and fourth seals 228, 234 failing and allowing the first and second sidewalls 202, 204 to separate. More particularly, the bond strength of the first and fourth seals 228, 234 can be greater than a greatest tear strength of the film layer(s) of the first and second side walls 202, 204.

Figure 3:
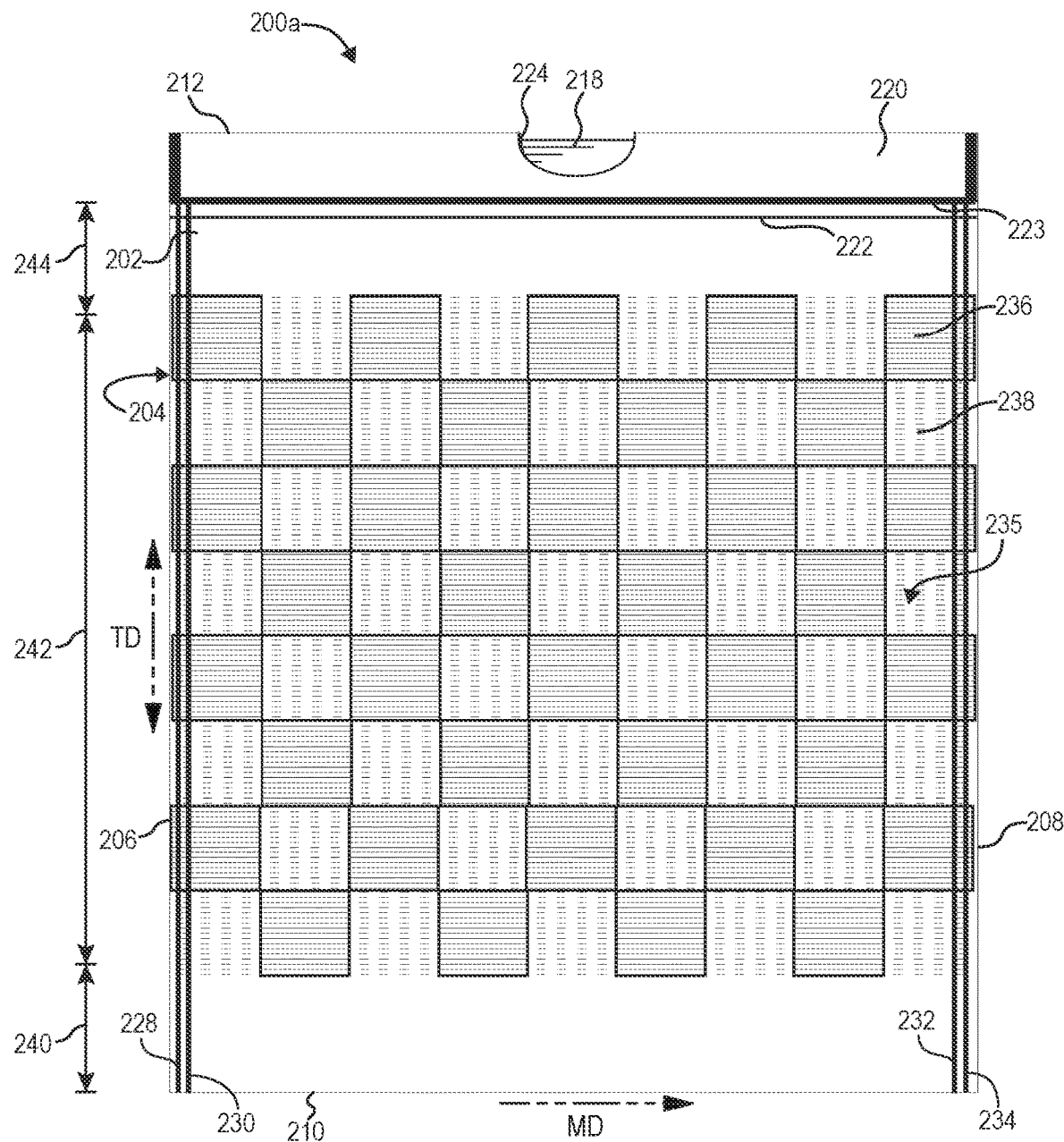
FIG. 3 illustrates a front view of another thermoplastic bag with duplicative seals in accordance with one or more implementations of the present invention.

As discussed above, duplicative seals can comprise a first seal securing at least two plies of thermoplastic film together along a first portion of the thermoplastic bag and a second seal securing the at least two plies of thermoplastic film together along the first portion of the thermoplastic bag. For example, the thermoplastic bag 200 of FIGS. 2A-2E includes first and second side seals securing the first and second sidewalls along first and second side edges. One will appreciate in light of the disclosure herein that the present invention is not so limited. In particular, any of the seals of a thermoplastic bag can be duplicative. In other words, in addition, or alternative, to duplicative side seals, one or more implementations include duplicative hem seals and/or tape seals. For example, FIG. 3 illustrates a thermoplastic bag 200a with duplicative hem seals. In particular, the thermoplastic bag 200a of FIG. 3 is similar to and includes many of the same features as the thermoplastic bag 200 of FIGS. 2A-2E as indicated by the similar reference numerals. In particular, the thermoplastic bag 200a includes duplicative side seals 228, 230 and 232, 234.

In addition, the thermoplastic bag 200a includes duplicative hem seals. In particular, the thermoplastic bag 200a can include a first hem seal 222 and a second hem seal 223. The first hem seal 222 secures at least two plies of thermoplastic film (e.g., two portions of the first side wall 202) together along a first portion (e.g., the hem 220) of the thermoplastic bag 220a. As shown by FIG. 3, rather than extending from the top of the thermoplastic bag to the bottom edge 210 as the duplicative side seals 228-234, the duplicative hem seals 222, 223 can extend from the first side edge 206 to the second side edge 208. Other than being perpendicular to the side edges 206, 208, the duplicative hem seals 222, 223 can have any of the features described above in relation to the duplicative side seals 228-234.

While FIG. 3 illustrates that the thermoplastic bag 200a includes both duplicative side seals and duplicative hem seals 222, 223, in alternative implementations, a thermoplastic bag can include duplicative hem seals 222, 223 with single side seals.

One or more implementations involve incrementally stretching one or more of the films of a thermoplastic bag with duplicative seals. Incrementally stretching the film(s) can provide an overall thinner film employing a reduced amount of raw material that nonetheless has maintained or increased strength parameters. For example, one or more implementations includes incrementally stretching a film using machine direction ("MD") ring rolling, transverse direction ("TD") ring rolling, helical or diagonal direction ("DD") ring rolling, the formation of strainable networks, embossing, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more implementations involve stretching processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

In particular, FIG. 3 illustrates that the thermoplastic bag 200a with duplicative seals includes a checkerboard pattern 235 of raised rib-like elements. As shown by FIG. 3, the checkerboard pattern 235 of deformations can comprise a repeating pattern of raised rib-like elements in a strainable network created using a SELF'ing (structural elastic-like film) process. The strainable network can comprise a plurality of raised rib-like elements extending in a direction perpendicular to a main surface of the thermoplastic film. The plurality of rib-like elements can be separated by troughs. The raised rib-like elements and troughs are surrounded by a plurality of web areas or main portions of the film. The strainable network provides the thermoplastic film with an elastic-like behavior. In particular, when subjected to an applied load, the raised rib-like elements can initially undergo a substantially geometric deformation before undergoing substantial molecular-level deformation when subjected to an applied load. On the other hand, the web areas can undergo a substantially molecular-level and geometric deformation in response to the applied strain. U.S. Pat. Nos. 5,518,801 and 5,650,214 each disclose processes for forming strainable networks using SELF'ing processes. The contents of each of the aforementioned patents are incorporated in their entirety by reference herein.

In particular, the checkerboard pattern 235 of deformation can include a first plurality of rib-like elements arranged in a macro pattern 236 and a second plurality of raised rib-like elements arranged in a micro pattern 238. The macro and the micro patterns 236, 238 of raised rib-like elements can repeat across a middle zone 242 of the thermoplastic bag 200a to form the checkerboard pattern 235. In one or more implementations, the macro pattern 236 is visually distinct from the micro pattern 238. As used herein, the term "visually distinct" refers to features of a film which are readily discernible to the normal naked eye when the web material or objects embodying the web material are subjected to normal use.

As used herein a macro pattern is a pattern that is larger in one or more ways than a micro pattern. For example, as shown by FIG. 3, the macro pattern 236 has larger/longer raised rib-like elements than the raised rib-like elements of the micro pattern 238. In alternative implementations, the surface area of a given macro pattern covers more surface area than a surface area covered by a given micro pattern. In still further implementations, a macro pattern can include larger/wider web portions between adjacent raised rib-like elements than web portions between adjacent raised rib-like elements of a micro pattern.

The raised rib-like elements can comprise portions of the film that are displaced in the Z-direction. In one or more embodiments, because the film is displaced in the Z-direction by pushing the rib-like elements in a direction perpendicular to a main surface of the thermoplastic film (thereby stretching the regions upward) a total length and width of the film does not substantially change when the film is subjected to the SELF'ing process of one or more implementations. In other words, the sidewalls 202, 204 (prior to undergoing the SELF'ing process) can have substantially the same width and length as the sidewalls 202, 204 resulting from the SELF'ing process.

The rib-like elements can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying such a film are subjected to an applied load or force. Types of geometric deformation include, but are not limited to bending, unfolding, and rotating.

Thus, upon application of a force, the raised rib-like elements can undergo geometric deformation before undergoing molecular-level deformation. For example, a strain applied to the sidewalls 202, 204 in a perpendicular to the major axes of the rib-like elements can pull the raised rib-like elements back into plane with the web areas prior to any molecular-level deformation of the raised rib-like elements. Geometric deformation can result in significantly less resistive forces to an applied strain than that exhibited by molecular-level deformation.

FIG. 3 illustrates that the entire sidewalls need not be incrementally stretched. In particular, the middle zone 242 includes the checkerboard pattern 235, while a top zone 244 and a bottom zone 240 are devoid of incremental stretching. As shown, the bottom zone 240 extends from the bottom edge 210 toward the top edge 212. The top zone 244 extends from the top edge 212 toward the bottom edge 210. The middle zone 242 is positioned between the bottom zone 240 and the top zone 244. As shown the fourth and sixth zones 240, 244 are devoid of deformations. Thus, the deformations vary across the height of the thermoplastic bag 200a from areas devoid of deformations to areas including deformations.

As previously mentioned each of the side walls 202, 204 can comprise one or more films (e.g., films 102a-102c). Thus, the thermoplastic bags with duplicative seals can comprise single layered bags or multi-layered bags. In the case of multi-layered bags, the thermoplastic bags with duplicative seals can have a bag-in-bag configuration. Implementations having sidewalls with multi layers that are SELF'ed as shown by FIG. 3 can comprise laminates with incremental bonds between the layers. In particular, the protrusions (e.g., rib-like elements) can be bonded together.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding, ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

In one or more embodiments, the first and second films of a side wall may be discontinuously bonded together via one or more of the methods of bonding films together as described in U.S. Pat. No. 8,603,609, the disclosure of which is incorporated in its entirety by reference herein. In particular, the first and second films may be bonded via one or more of MD rolling, TD rolling, DD ring rolling, SELF'ing, pressure bonding, corona lamination, adhesives, or combinations thereof. In some implementations, the first and second films may be bonded such that the bonded regions have bond strengths below a strength of the weakest film of the first and second films. In other words, the bonded regions may fail (e.g., break apart) before the first or second films fail. As a result, discontinuously bonding the first and second films may can also increase or otherwise modify one or more of the tensile strength, tear resistance, impact resistance, or elasticity of the films. Furthermore, the bonded regions between the first and second films may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Figure 4:
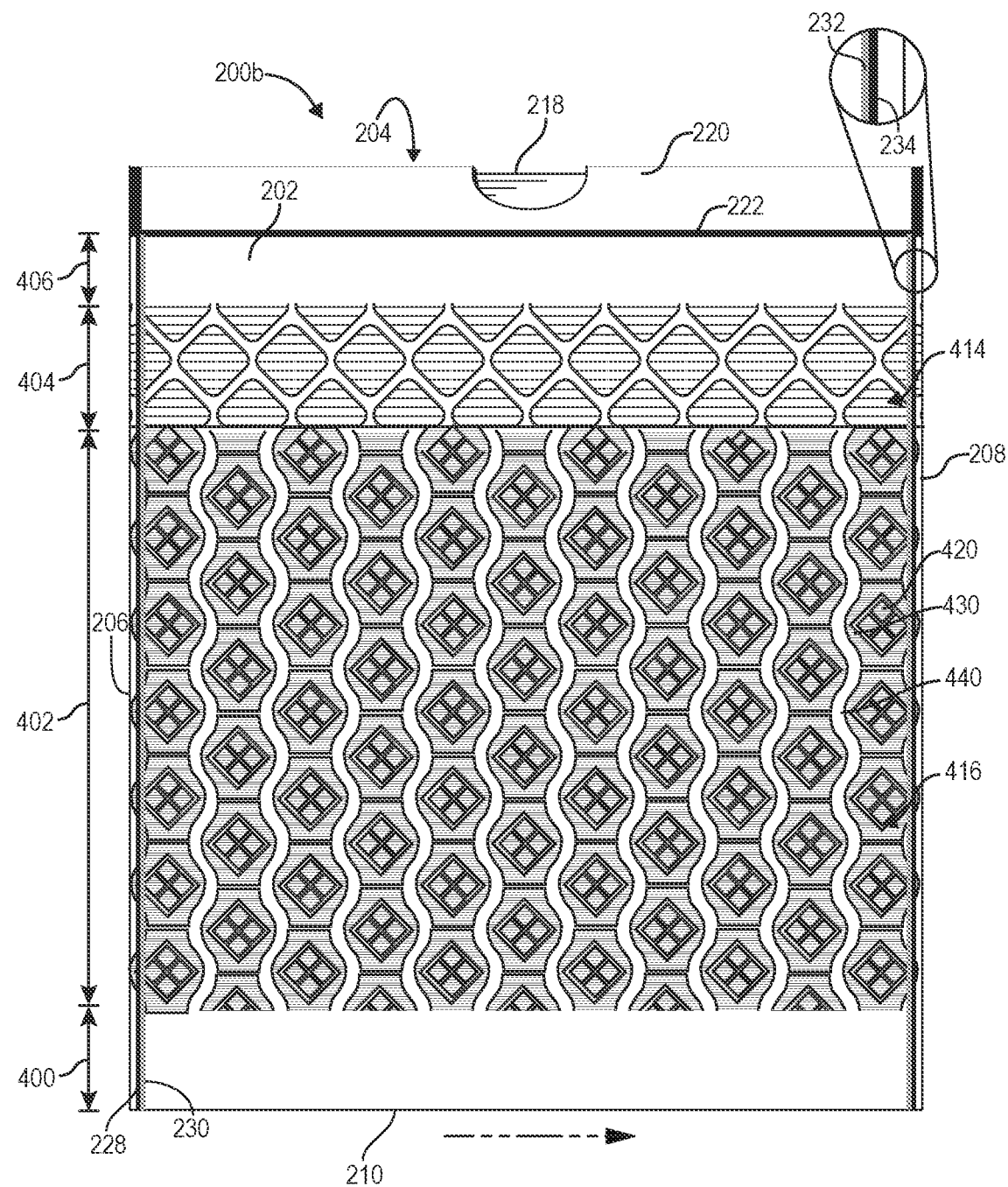
FIG. 4 illustrates a front view of yet another thermoplastic bag with duplicative seals in accordance with one or more implementations of the present invention.

FIG. 3 illustrates a thermoplastic bag with duplicative seals that is incrementally stretched in a single method to form a single pattern (e.g., the checkerboard pattern 235). In alternative implementations, thermoplastic bag with duplicative seals can include multiple different patterns of incremental stretching. For example, FIG. 4 illustrates a thermoplastic bag 200b with duplicative seals similar to the thermoplastic bag 200 with duplicative seals of FIG. 2A albeit with zones having different patterns. The features of the thermoplastic bag 200b with duplicative seals that are the same as the features of the thermoplastic bag 200 with duplicative seals include the same reference numerals.

As shown by FIG. 4, the thermoplastic bag 200b includes an upper region 410 with a first SELFing pattern 414 (e.g., a diamond pattern) and a middle region 412 with a second SELFing pattern 416. In particular, the upper region 410 of the thermoplastic bag with duplicative seals 200b includes a diamond pattern. The diamond pattern can comprise raised-rib-like elements arranged in diamond patterns where the intersections of the sides of the diamond are rounded rather than ending in corners. The second SELFing pattern 416 includes a first plurality of raised rib-like elements 430 in a macro pattern (a bulbous pattern) and a second plurality of raised rib-like elements 420 in a micro pattern (a diamond pattern). As shown, the second plurality of raised rib-like elements 420 in the micro pattern are nested within the macro patterns. Furthermore, the second SELFing pattern 416 includes web areas 440. The web areas 440 can surround the micro and the macro patterns of raised rib-like elements. Furthermore, as shown by FIG. 4, the web areas 440 are arranged in a sinusoidal pattern. The pattern of web areas 440 can affect how the raised rib-like elements expand and move when being strained and subsequently released. Furthermore, the pattern of the web areas 440 can direct liquid to the bottom of the thermoplastic bag 200b with duplicative seals. A top region or zone 408 and a bottom region or zone 400 are both devoid of incremental stretching.

FIGS. 2A-3 include duplicative seals that are separated by a gap. One will appreciate that the invention is not so limited. For example, FIG. 4 illustrates that the duplicative seals 228, 230 and 232, 234 abut directly against each other and visually appear as a single seal. Despite appearing as a continuous seal across the width, the duplicative seals 228, 230 and 232, 234 can still vary. For example, the inner side seals 230 and 232 comprise peel-able seals as described above. Thus, while appearing a continuous seal, the inner side seals 230 and 232 are configured separate to absorb forces directed toward the side edges 206, 208.

Figure 5:
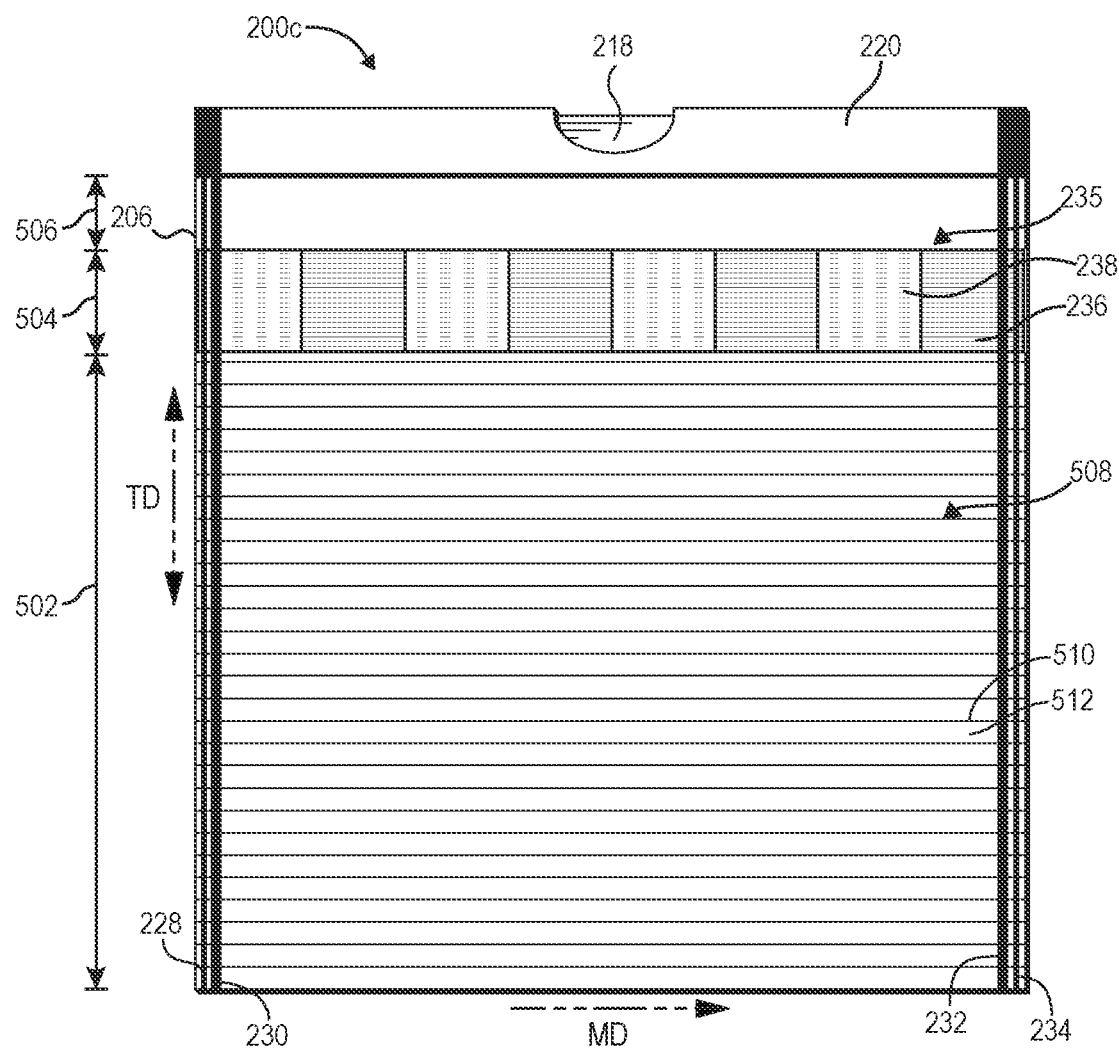
FIG. 5 illustrates a front view of still another thermoplastic bag with duplicative seals in accordance with one or more implementations of the present invention.

In addition to varying bond strength, one or more implementations can involve varying size of the duplicative seals 228, 230 and 232, 234. For example, FIG. 5 illustrates a thermoplastic bag 200c with duplicative seals similar to the thermoplastic bag 200 with duplicative seals of FIG. 2A albeit with duplicative seals 228, 230 and 232, 234 having varying sizes. The features of the thermoplastic bag 200c with duplicative seals that are the same as the features of the thermoplastic bag 200 with duplicative seals include the same reference numerals.

As shown by FIG. 5, the pairs of duplicative seals can have seals that vary in size. In particular, the inner sides seals 230, 232 can have a size greater than the outer side seals 228, 234. More particularly, the inner sides seals 230, 232 can have a first width greater than a second width of the outer side seals. The difference in size can provide aesthetic and/or functional benefits. For example, the wider seals 230, 232 can be more visually prominent, and thereby, create a desired aesthetic. Similarly, the wider seals 230, 232 have more surface area bonding the first and second sidewalls 202, 204 together. Thus, the wider seals 230, 232 can have a greater strength than thinner seals.

All of the patterned regions of the thermoplastic bags with duplicative seals shown and described above comprise SELFing. In alternative implementations, thermoplastic bags comprising laminates with duplicative seals can include patterned regions formed from cold deformation techniques other than SELFing. For example, the thermoplastic bag 200c with duplicative seals of FIG. 5 comprises a SELF'ed pattern and a ring rolled pattern.

As shown by FIG. 5, the thermoplastic bag 200c with duplicative seals includes a bottom region 502 with a ring-rolled pattern 508 and an upper region 504 with a checkerboard SELF'ing pattern 234. The ring-rolled pattern 508 includes a first plurality of thicker ribs 510 that alternate with thinner stretched webs 512.

Figure 6:
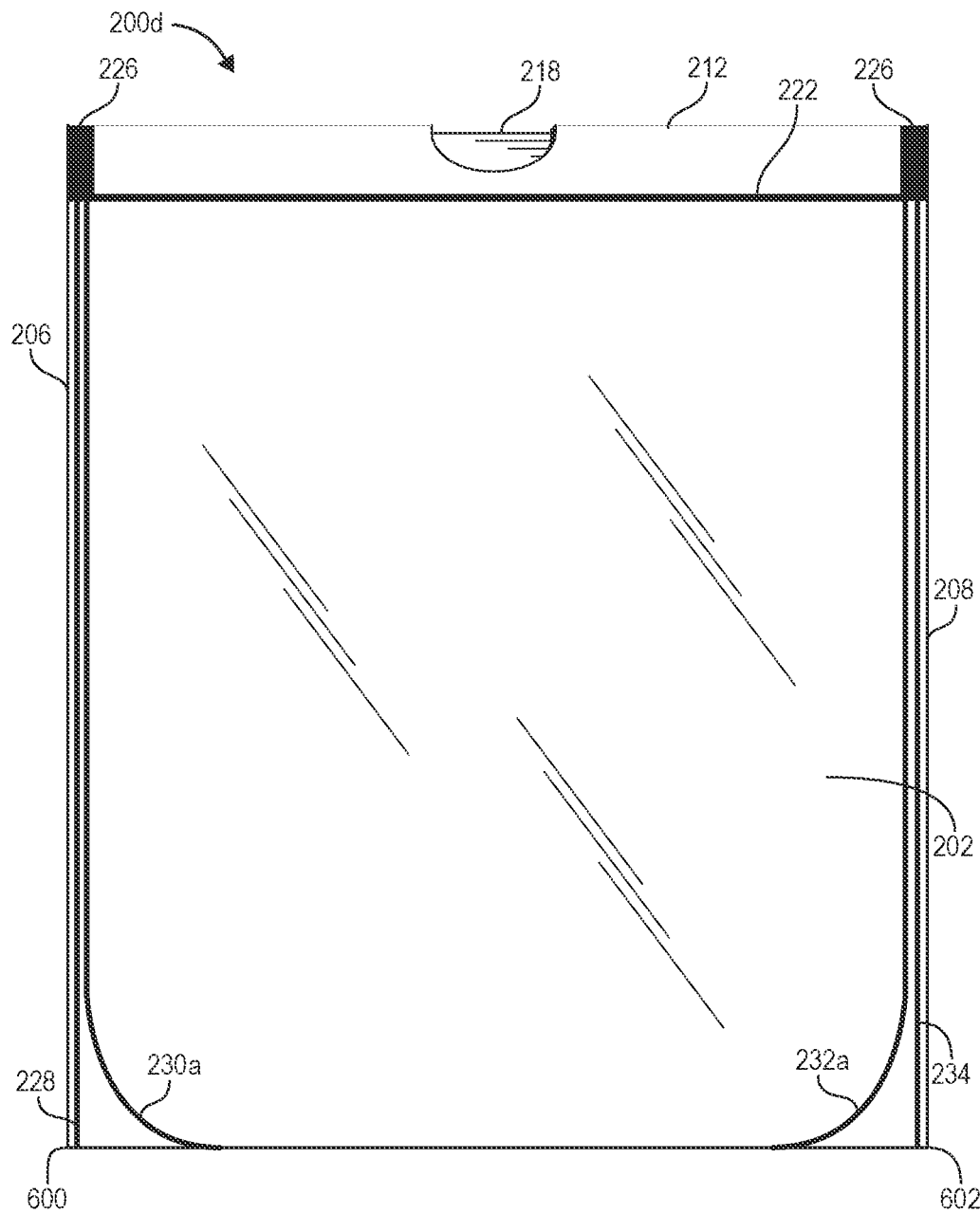
FIG. 6 illustrates a front view of another thermoplastic bag with duplicative seals in accordance with one or more implementations of the present invention.

In addition to providing a reinforcement the duplicative side seals can also act as liquid directing features to prevent liquid within a thermoplastic bag with duplicative seals from reaching areas that are typically more prone to leaks. For example, FIG. 6 illustrates a thermoplastic bag 200d with duplicative seals in which the inner duplicative seals 230a, 232a can each seal off, or isolate, the corners 600, 602 of the thermoplastic bag 200d with duplicative seals. Thus, the liquid directing inner duplicative seals 230a, 232a can direct liquid away from the corners 600, 602 of the thermoplastic bag 200d with duplicative seals. For example, the liquid directing inner duplicative seals 230a, 232a can prevent liquid from reaching the corners 600, 602 of the thermoplastic bag. The thermoplastic bag can help reduce or eliminate leaks by preventing liquid from reaching the corners 600, 602 of the thermoplastic bag. As corners of bag are one of the most likely portion of a bag to leak, the thermoplastic bag 200d with duplicative seals can reduce or eliminate leaking. In one or more further embodiments, the corners 600, 602 of the thermoplastic bag are removed. In other words, the material of the side walls below the liquid directing inner duplicative seals 230a, 232a can be removed such that the liquid directing inner duplicative seals 230a, 232a form part of the outer boundary of the thermoplastic bag.

As shown by FIG. 6, the liquid directing inner duplicative seals 230a, 232a can have a curvilinear shape in contrast to the linear shape of the outer duplicative seals 228, 234. The non-linear shape can provide a desired aesthetic in addition to directly liquids away from the corners 600, 602. In alternative implementations, one or more of the seals of the duplicate seals has a serpentine or other decorative shape.

While FIG. 6 illustrates the curvature of the liquid directing inner duplicative seals 230a, 232a starting near the bottom of the thermoplastic bag 200d, in alternative implementations, the curvature of the liquid directing inner duplicative seals 230a, 232a can start at another position between the bottom and top edges. For example, the curvature of the liquid directing inner duplicative seals 230a, 232a can start from the top of the bag, halfway up the bag from the bottom edge, a quarter of the way up the bag, an eighth of the way up the bag from the bottom edge, a tenth of the way up the bag, or another distance from the bottom edge.

Figure 7:
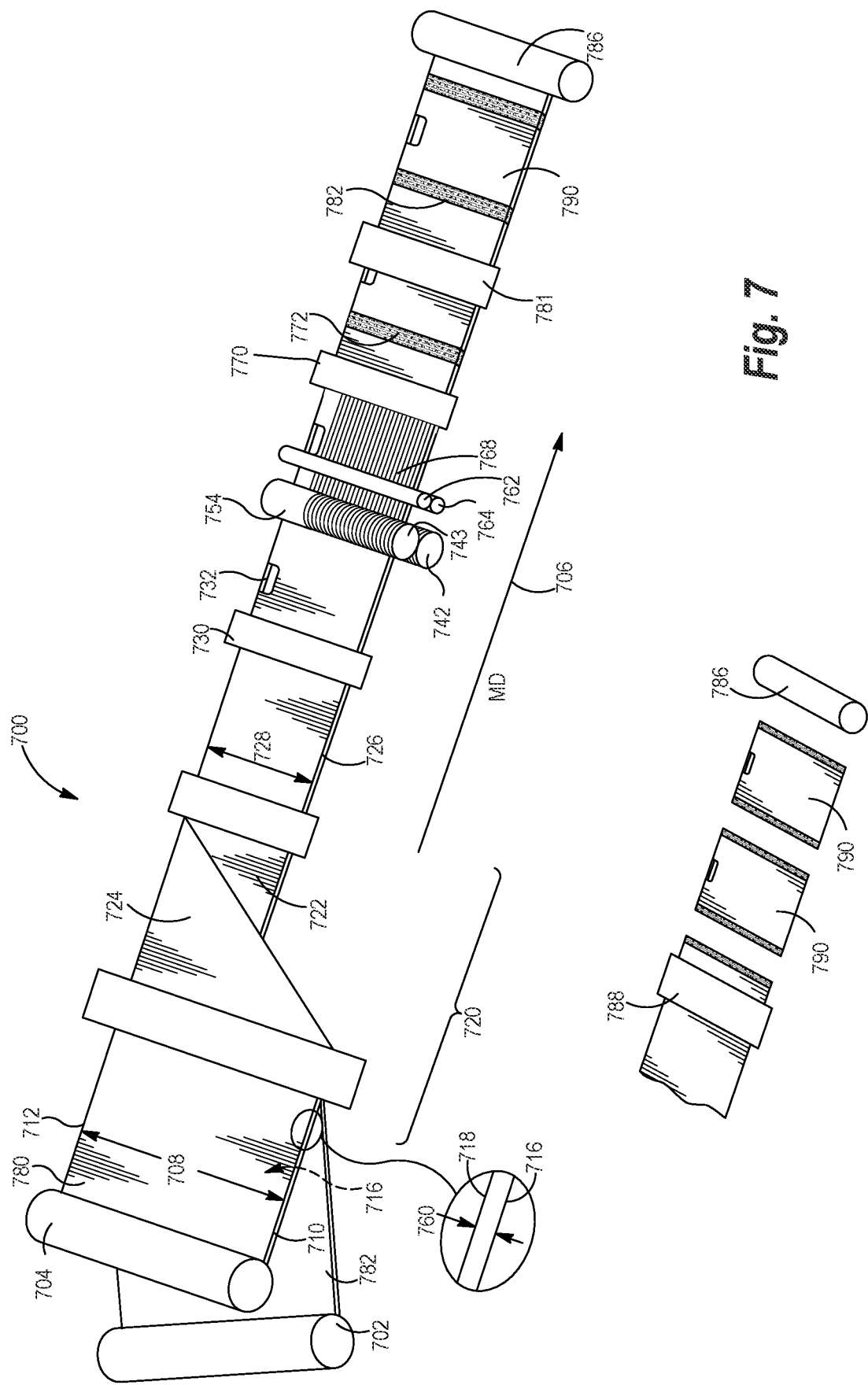
FIG. 7 illustrates a schematic diagram of a bag manufacturing process in accordance with one or more implementations of the present invention.

One or more implementations of the present invention can also include methods of forming thermoplastic bags with duplicative seals. FIG. 7 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

In particular, to produce thermoplastic bags with duplicative seals, continuous webs of thermoplastic material may be processed through a high-speed manufacturing environment such as that illustrated in FIG. 7. In the illustrated process 700, production may begin by unwinding a first continuous web or film 780 of a first thermoplastic material from a roll 704 and advancing the web along a machine direction 706. The unwound web 780 may have a width 708 that may be perpendicular to the machine direction 706, as measured between a first edge 710 and an opposite second edge 712. The unwound web 780 may have an initial average thickness 760 measured between a first surface 716 and a second surface 718. In other manufacturing environments, the web 780 may be provided in other forms or even extruded directly from a thermoplastic forming process.

The process 700 further can optionally involve unwinding a second continuous web or film 782 of a second thermoplastic material from a roll 702 and advancing the web along a machine direction 706. The second film 782 can comprise, a width, and/or a thickness that is similar or the same as the first film 780. In alternative one or more implementations, one or more of the width, and/or thickness of the second film 782 can differ from that of the first film 780.

To provide sidewalls of the finished bag, the film(s) 780, 782 may be folded into a first half 722 and an opposing second half 724 about the machine direction 706 by a folding operation 720. When so folded, the first edge 710 may be moved adjacent to the second edge 712 of the film(s) 780, 782. Accordingly, the width of the film(s) 780, 782 proceeding in the machine direction 706 after the folding operation 720 may be a width 728 that may be half the initial width 708. As may be appreciated, the portion mid-width of the unwound film(s) 780, 782 may become the outer or bottom edge 726 of the folded web. In any event, the hems may be formed along the adjacent first and second edges 710, 712 and a draw tape 732 may be inserted during a hem and draw tape operation 730.

To optionally bond multiple films together and incrementally stretch the films, the processing equipment includes intermeshing rollers 742, 743. The intermeshing rollers 742, 743 can comprise SELFing rollers, ring rollers, embossing rollers or other intermeshing rollers. The folded film(s) 780, 782 may be advanced along the machine direction 706 between the intermeshing rollers 742, 743, which may be set into rotation in opposite rotational directions to impart the resulting deformation pattern 768. To facilitate formation of the deformations, the intermeshing rollers 742, 743 may be forced or directed against each other by, for example, hydraulic actuators. The pressure at which the rollers are pressed together may be in a first range from 30 PSI (2.04 atm) to 70 PSI (6.8 atm), a second range from 60 PSI (4.08 atm) to 90 PSI (6.12 atm), and a third range from 75 PSI (5.7 atm) to 85 PSI (5.78 atm). In one or more implementations, the pressure may be about 80 PSI (5.44 atm).

In the illustrated implementation, the intermeshing rollers 742, 743 may be arranged so that they are co-extensive with or wider than the width 728 of the folded film(s) 780, 782. In one or more implementations, the deformation pattern 768 created by intermeshing rollers 742, 743 may extend from proximate the folded edge 726 to the adjacent edges 710, 712. To avoid imparting the deformations onto the portion of the film(s) 780, 782 that includes the draw tape 732, the corresponding ends 754 of the phased intermeshing rollers 742, 743 may be smooth and without the ridges and grooves. Thus, the adjacent edges 710, 712 and the corresponding portion of the film(s) 780, 782 proximate those edges that pass between the smooth ends 754 of the phased intermeshing rollers 742, 743 may not be imparted with deformations.

The processing equipment may include pinch rollers 762, 764 to accommodate the width 728 of the film(s) 780, 782. To produce the finished bag, the processing equipment may further process the folded film(s) 780, 782. To form the duplicative seals, the film(s) 780, 782 may proceed through a sealing operation 770 in which duplicative heat seals 772 may be formed between the folded edge 726 and the adjacent edges 710, 712. The heat seals may fuse together the halves 722, 724 of the folded film(s) 780, 782. The duplicative heat seals 772 may be spaced apart along the folded film(s) 780, 782 and in conjunction with the folded outer edge 726 may define individual bags. The duplicative heat seals 772 may be made with a heating device, such as, a heated knife. A perforating operation 781 may form perforations 782 in the duplicative heat seals 772 with a perforating device, such as, a perforating knife so that individual bags 790 may be separated from the film(s) 780, 782. More particularly, as explained in greater detail below, each group of duplicative heat seals 772 can comprise four duplicative heat seals (a first pair of duplicative heat seals and a second pair of duplicative heat seals). The perforating operation 781 may form perforations 782 between the first and second pairs of duplicative heat seals such that the first and second pairs of duplicative heat seals in each group of duplicative heat seals are part of separate bags.

In one or more implementations, the film(s) 780, 782 may be folded one or more times before the folded film(s) 780, 782 may be directed through the perforating operation. The film(s) 780, 782 embodying the bags 790 may be wound into a roll 786 for packaging and distribution. For example, the roll 786 may be placed in a box or a bag for sale to a customer.

In one or more implementations of the process, a cutting operation 788 may replace the perforating operation 780. The film(s) 780, 782 is directed through a cutting operation 788 which cuts the film(s) 780, 782 between the first and second pairs of duplicative heat seals into individual bags 790 prior to winding onto a roll 786 for packaging and distribution. For example, the roll 786 may be placed in a box or bag for sale to a customer. The bags may be interleaved prior to winding into the roll 786. In one or more implementations, the film(s) 780, 782 may be folded one or more times before the folded web is cut into individual bags. In one or more implementations, the bags 790 may be positioned in a box or bag, and not onto the roll 786.

Figure 8:
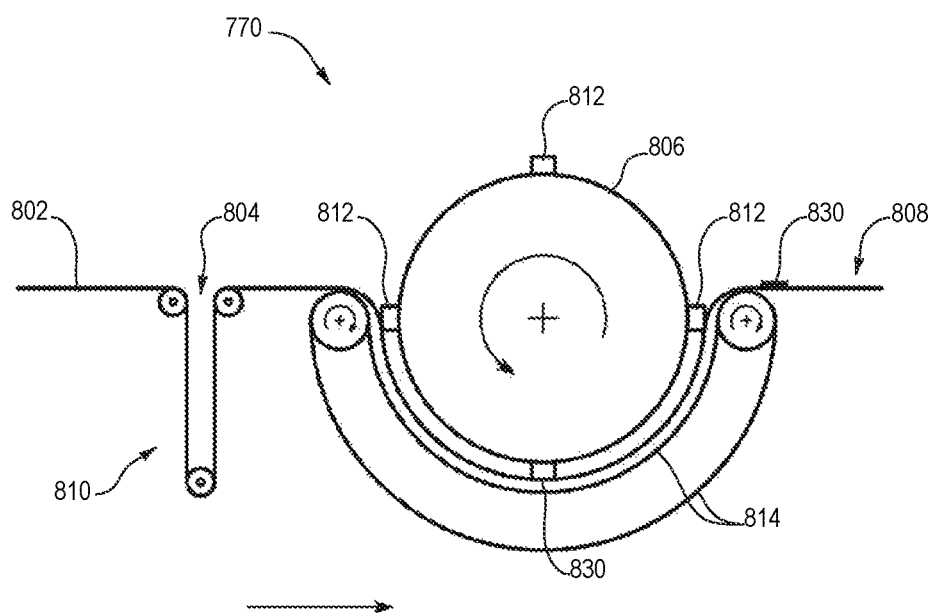
FIG. 8 illustrates a schematic diagram of a seal creation process in accordance with one or more implementations of the present invention.

The sealing operation 770 shown in FIG. 7 can be part of a continuous (FIG. 8) or a reciprocating (FIG. 10) bag-making process. As shown in FIG. 8, a continuous sealing process 770 typically has an input section 804, a rotary drum 806, and an output section 808. The film plies 802 continuously travel from the input section 804 to the rotary drum 806 and then to the output section 808.

The input section generally consists of a driven dancer assembly 810 to control film tension. The rotary drum 806 contains a plurality of heated seal bars 812 which can press against a sealing blanket 814 to make seals 830 on the film plies 802. The heated seal bars 812 heat the film plies 802 from one side.

Side-to-side bags are formed by the heated seal bars 812 each forming a two pairs of duplicative seals 830. The drum 806 diameter may be adjusted and/or less than all of the seal bars 812 turned on to determine the distance between seals 830, and hence, bag size. The output section 808 generally includes assemblies that act on the film plies 802 downstream of the seals 830 being formed, such as perforators, winders, folders and the like. The continuous bag making process 770 has the advantage of operating at very high speeds (600 ft./min=300 bags/min).

The continuous bag making process 770 can additionally be used to make both the side seals and the tape or hem seals described above. Because the tape seals hem seals can involve more plies of material or different materials compared with the side seals, the seal bars 812 can be divided into two individual seal bars. In particular, the seal bars can include a long seal side seal bar and a shorter tape seal bar. Because the bag may have different plies of material in the side seals and the tape seals, the side seal bar may have different heating properties from the tape seal bar. For example, the tape seal bar may be heated to a higher temperature to penetrate the additional plies in the tape seals.

Figure 9:
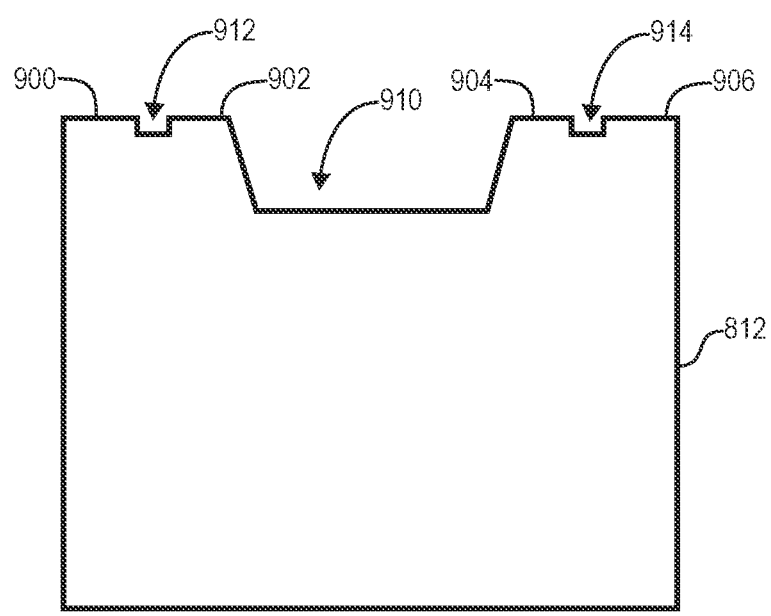
FIG. 9 illustrate an end view of a seal bar in accordance with one or more implementations of the present invention.

FIG. 9 illustrates an end view of a duplicative seal bar 812. As shown, the duplicative seal bar 812 includes four sealing surfaces 900, 902, 904, 906. The first pair of sealing surfaces 900, 902 can be separated by a recess 912 and the second pair of sealing surfaces 904, 906 can be separated by another recess 914. The recesses 912, 914 cause the formation of the gap between duplicative seals as described above. In alternative implementations the duplicative seal bar 812 can lack the recesses 912, 914 so that formed duplicative seals abut directly against each other as described above. The duplicative seal bar 812 further includes a dividing groove 910 that defines the size of the edges of the bags.

Additionally, the four sealing surfaces 900, 902, 904, 906 of the heat seal bars 812 can have a width equal to or greater than about $1/32$nd. In particular, in one or more embodiments the four sealing surfaces 900, 902, 904, 906 of the heat seal bars 812 can have a width of between about $1/32$nd of an inch and about 1 inch. More particularly, the four sealing surfaces 900, 902, 904, 906 of the heat seal bars 812 can have a width of $1/8$th an inch, $1/16$th an inch, $1/4$th an inch, $1/2$ an inch, $3/4$ an inch, etc. One will appreciate that the seals formed by the seal bars 812 will have a corresponding width. The four sealing surfaces 900, 902, 904, 906 of the heat seal bars 812 can form heat seals having a corresponding width. The increased widths of the heat seal bars 812 can allow for the formation of visually noticeable seals. Furthermore, in one or more embodiments a width of the first sealing surfaces 900, 906 differ from the width of the second sealing surfaces 902, 904 such that pair of duplicative seals having differing sizes as described above.

In addition to the foregoing, the process of forming the duplicative seals can involve varying a dwell time, a pressure, or a temperature of the first sealing surfaces 900, 906 versus the second sealing surfaces 902, 904 so as to create peel-able and non-peel-able seals. In particular, reducing one or more of a dwell time, a pressure, or a temperature of a sealing surface can lead to the generation of a peel-able seal rather than a non-peel-able seal.

Figure 10:
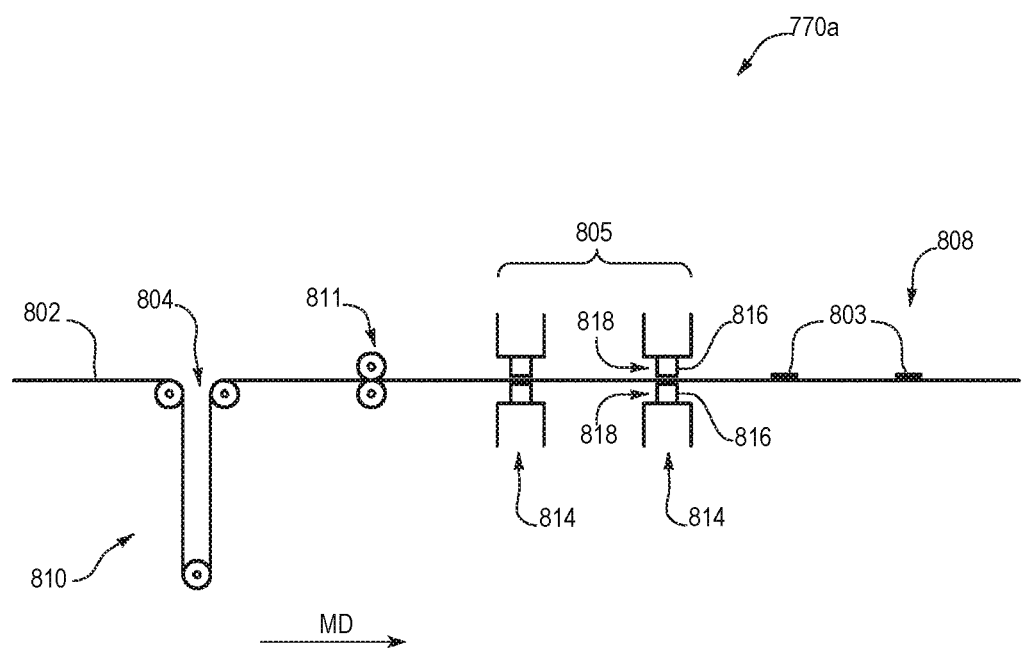
FIG. 10 illustrates a schematic diagram of another seal creation process in accordance with one or more implementations of the present invention.

As shown in FIG. 10, a reciprocating sealing process 770a typically has an input section 804, a linear sealing section 805, and an output section 808. The input section 804 generally includes of a dancer assembly 810, and a driven nip 811. The film plies 802 are unwound continuously from a roll or during a continuous process and pass through the dancer assembly 810 to the driven nip 811. The driven nip 811 rotates intermittently, with one cycle of rotation reflecting the width of one bag. The nip 811 can stop for sealing and the time the nip 811 is motionless is adjustable as required for downstream operations (such as sealing).

The dancer assembly 810, prior to the intermittently operating nip 811 and after the continuously operating unwind or process, can gather the film plies 802 during the time the nip 811 is not rotating. This can provide enough film plies 802 to satisfy the requirements of the nip 811 when it begins rotating again. Hence, in the input section 804, the film plies 802 can move in a continuous manner, travel through a dancer assembly 810 that gathers the film plies 802, and through a nip 811 that operates in an intermittent manner, converting the film plies 802 motion from a continuous motion to an intermittent motion, one bag width at a time.

The linear sealing section 805 of a reciprocating bag making process 770a can include of one or more sealing stations 814 with heated seal bars 816 spaced one bag width apart. The heated seal bars 816 can contact the film plies 802 each time the film plies 802 motion stops as the film plies 802 travel in a straight path through the machine. During the film plies 802 stoppage time, each seal bar 816 (similar to seal bars 812) on a sealing station 814 can move from a stationary position 818 above or below the web to a position which places the seal bar 816 in contact with the film plies 802 from both sides. The seal bar 816 can then contact the film plies 802 for a period of time as required to make the duplicative seals 803. The seal bar 816 can then retract to its original stationary position 818, after which the film plies 802 advance intermittently a multiple of one or more bag widths and the process is repeated. The reciprocating process 770a has the advantage of long residence times, heating the film plies from both sides and high quality seals 803, but can be limited in rate (typically 180 bags/min).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A thermoplastic bag, comprising:
   first and second sidewalls comprising thermoplastic films;
   the first and second sidewalls comprising a first side edge, an opposite second side edge, a bottom edge, and an opening along respective top edges;
   a first seal securing at least two plies of thermoplastic film together along a first portion of the thermoplastic bag; and
   a second seal securing the at least two plies of thermoplastic film together along the first portion of the thermoplastic bag;
   wherein:
   the first seal has a first bond strength that causes the first seal to fail prior to failure of the at least two plies of thermoplastic film when strained; and
   the second seal has a second bond strength that causes the at least two plies of thermoplastic film to fail prior to failure of the second seal.

2. The thermoplastic bag as recited in claim 1, wherein:
   the first portion of the thermoplastic bag is the first side edge;
   the at least two plies comprise the first and second sidewalls; and
   the first and second seals comprise side seals.

3. The thermoplastic bag as recited in claim 2, wherein at least a section of one or more of the first and second seals extend away from the first side edge to the bottom edge so as to seal off a corner of the thermoplastic bag where the first side edge meets the bottom edge.

4. The thermoplastic bag as recited in claim 1, further comprising:
   a third seal securing two or more plies of thermoplastic film together along a second portion of the thermoplastic bag; and
   a fourth seal securing the two or more plies of the thermoplastic film together along the second portion of the thermoplastic bag.

5. The thermoplastic bag as recited in claim 4, wherein:
   the second portion of the thermoplastic bag is the second side edge;
   the two or more plies comprise the first and second sidewalls; and
   the third and fourth seals comprise side seals.

6. The thermoplastic bag as recited in claim 1, wherein:
   the first portion of the thermoplastic bag is a hem;
   the at least two plies comprise two portions of the first sidewall; and
   the first and second seals comprise hem seals.

7. The thermoplastic bag as recited in claim 1, wherein the first and second seals abut directly against each other and visually appear as a single seal.

8. The thermoplastic bag as recited in claim 1, wherein one or more of the first and second seals are non-linear.

9. The thermoplastic bag as recited in claim 1, wherein the first and second seals differ in width.

10. A thermoplastic bag, comprising:
    first and second opposing sidewalls joined together along a first side edge, an opposite second side edge, and a bottom edge, the first and second sidewalls being un-joined along at least a portion of their respective top edges to define an opening;
    a first pair of side seals securing the first and second sidewalls together along the first side edge; and
    a second pair of side seals securing the first and second sidewalls together along the second side edge;
    wherein:
    a first seal of the first pair of side seals and a first seal of the second pair of side seals are peel-able seals; and
    a second seal of the first pair of side seals and a second seal of the second pair of side seals are non-peel-able seals.

11. The thermoplastic bag as recited in claim 10, wherein:
    the first pair of side seals abut directly against each other; and
    the second pair of side seals abut direct against each other.

12. The thermoplastic bag as recited in claim 10, wherein:
    a first seal of the first pair of side seals is separated from a second seal of the first pair of side seals by a first gap; and
    a first seal of the second pair of side seals is separated from a second seal of the second pair of side seals by a second gap.

13. The thermoplastic bag as recited in claim 10, further comprising:
    a third seal securing the first and second sidewalls together along the first side edge; and
    a fourth seal securing the first and second sidewalls together along the second side edge.

14. The thermoplastic bag as recited in claim 10, wherein:
    a first seal of the first pair of side seals and a first seal of the second pair of side seals have a first shape; and
    a second seal of the first pair of side seals and a second seal of the second pair of side seals have a second shape that differs from the first shape.

15. The thermoplastic bag as recited in claim 14, wherein:
the first shape is linear; and
the second shape is curvilinear.

* * * * *